W. D. DRUSE.
MOLD.
APPLICATION FILED JUNE 14, 1920.
1,418,137.
Patented May 30, 1922.
2 SHEETS—SHEET 1.
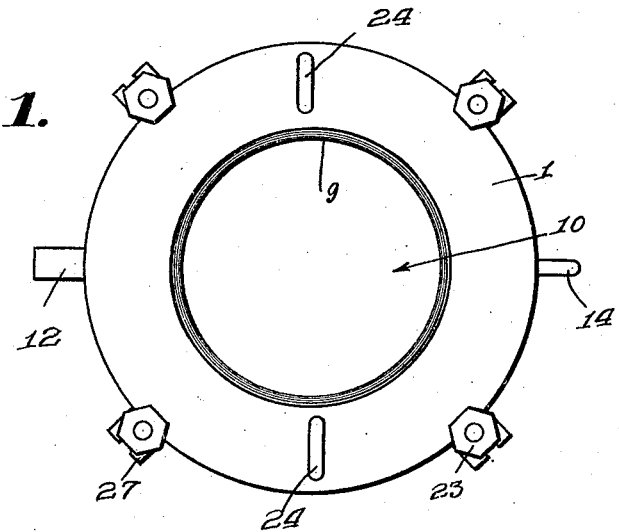
Fig. 1.
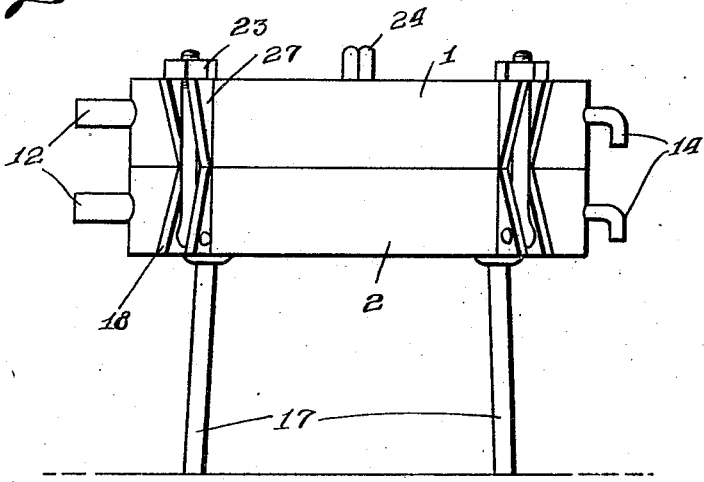
Fig. 2.
Witness
Inventor
W. D. Druse
By C. A. Snow & Co.
Attorneys

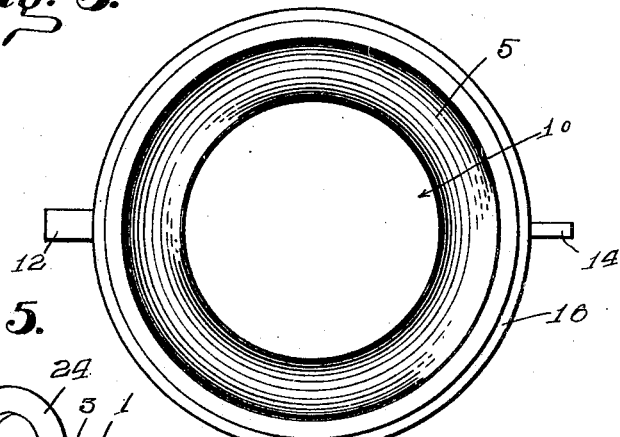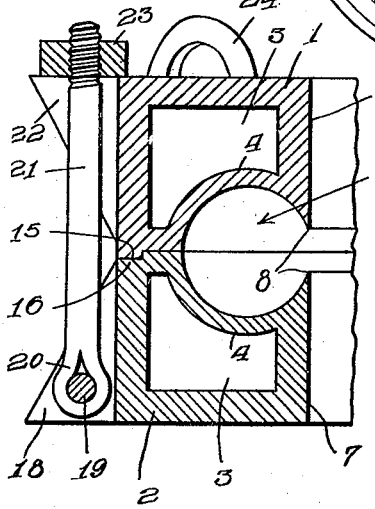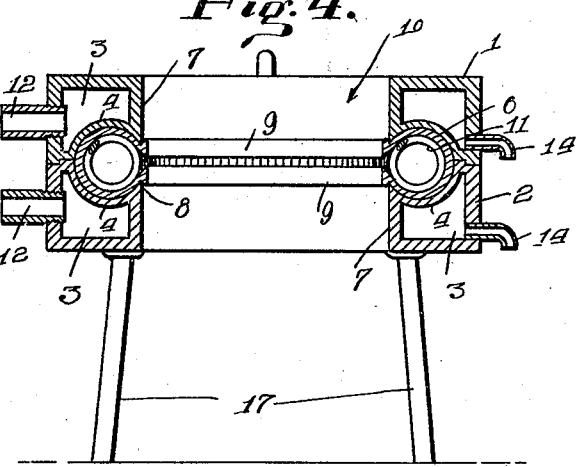

UNITED STATES PATENT OFFICE.

WARREN D. DRUSE, OF KAHOKA, MISSOURI.

MOLD.

1,418,137.   Specification of Letters Patent.   Patented May 30, 1922.

Application filed June 14, 1920. Serial No. 388,914.

*To all whom it may concern:*

Be it known that I, WARREN D. DRUSE, a citizen of the United States, residing at Kahoka, in the county of Clark and State of Missouri, have invented a new and useful Mold, of which the following is a specification.

This invention aims to provide novel means whereby, when a tire casing is repaired, the body portion of the casing may be vulcanized without over-curing the beads of the casing.

The invention aims to provide novel means for holding the constituent members of the mold together and to provide novel means for heating them.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Figure 2 is a side elevation; Figure 3 is a top plan of the lower member of the mold; Figure 4 is a transverse section; and Figure 5 is a fragmental transverse section on an enlarged scale, disclosing sundry elements which do not appear in Figure 4.

The mold forming the subject matter of this application comprises an annular top member 1 and an annular bottom member 2, the members 1 and 2 having heating chambers 3. The members 1 and 2 include curved walls 4 which cooperate to define a cavity 5 for the reception of a tire casing 6. The curved walls 4 and the inner walls 7 of the members 1 and 2 define relatively sharp edges 8 adapted to be engaged in the grooves between the body of the tire casing 6 and the beads 9 thereof, thereby to dispose the beads in the central opening 10 of the annular members 1 and 2, as shown in Figures 1 and 4, the beads of the tire casing being disposed out of alinement with the heating chambers 3. As a consequence of the foregoing construction, the beads 9 are never overheated or over-cured. Any suitable means may be provided for expanding or supporting the tire casing 6 internally. If preferred, a helical spring 11 may be employed for the purpose stated, the spring being fashioned in a plurality of sections. The steam inlets for the chambers 3 are denoted by the reference numeral 12, the outlets being shown at 14. The members 1 and 2 of the mold are provided with interengaging elements whereby relative lateral movement between the said members is prevented, one of the aforesaid elements being in the form of a circumscribing rib 15 on the top member 3, the rib being received in a recess 16 in the bottom member 2. The bottom member 2 of the mold may be supported on legs 17. The bottom member of the mold is supplied with outstanding ears 18 disposed in pairs, the ears carrying pivot elements 19 receiving eyes 20 on bolts 21 adapted to be swung between ears 22 on the top member 1, nuts 23 being threaded on the bolts, the nuts coacting with the ears 27 to draw and hold the parts 1 and 2 of the mold together. The bolts 21 and the nuts 23 may be denominated latches adapted to hold the members of the mold together. The top member 1 of the mold may be supplied with suitable handles 24, whereby the said member may be lifted off the bottom member 2 or be manipulated otherwise.

The construction of the device, obviously is such that a tire may be patched, repaired or otherwise worked upon, without overheating or over-curing the beads. When the members 1 and 2 of the mold are disposed in working position as shown in Figure 4 the said members of the mold will be held together firmly, so as to hold and compress the casing 6 during the curing operation.

Having thus described the invention, what is claimed is:—

A device of the class described comprising annular members having heating chambers, the said members including curved walls which cooperate to define a cavity for the reception of a tire casing, the curved walls and the inner walls of the annular members defininig relatively sharp edges adapted to be engaged in the grooves between the body of a tire casing and the beads thereof, thereby to hold the casing positively in such a position that the beads of the tire casing will be disposed in the central opening of the annular members and out of alinement with the heating chambers.

In testimony that I claim the foregoing as my own, I have hereto affixed my signature in the presence of two witnesses.

WARREN D. DRUSE.

Witnesses:
GEO. H. TURNER,
FRED C. BOUMAN.